United States Patent
Herkommer et al.

(10) Patent No.: US 10,539,232 B2
(45) Date of Patent: Jan. 21, 2020

(54) FLUID ARRANGEMENT

(71) Applicant: SCHAEFFLER TECHNOLOGIES AG & CO. KG, Herzogenaurach (DE)

(72) Inventors: Dominik Herkommer, Schriesheim (DE); Markus Baehr, Bühl (DE)

(73) Assignee: Schaeffler Technologies AG & Co., Herzogenaurach (DE)

( * ) Notice: Subject to any disclaimer, the term of this patent is extended or adjusted under 35 U.S.C. 154(b) by 370 days.

(21) Appl. No.: 15/104,925

(22) PCT Filed: Dec. 16, 2014

(86) PCT No.: PCT/DE2014/200719
§ 371 (c)(1),
(2) Date: Jun. 15, 2016

(87) PCT Pub. No.: WO2015/090317
PCT Pub. Date: Jun. 25, 2015

(65) Prior Publication Data
US 2016/0327157 A1 Nov. 10, 2016

(30) Foreign Application Priority Data
Dec. 17, 2013 (DE) .......... 10 2013 226 309

(51) Int. Cl.
*F15B 11/16* (2006.01)
*F16D 25/12* (2006.01)
(Continued)

(52) U.S. Cl.
CPC .......... *F16H 61/28* (2013.01); *F15B 11/16* (2013.01); *F16D 25/12* (2013.01); *F16H 61/0025* (2013.01); *F16H 61/2807* (2013.01)

(58) Field of Classification Search
CPC .......................... F16H 61/30; F16H 61/28
See application file for complete search history.

(56) References Cited

U.S. PATENT DOCUMENTS 5,101,942 A * 4/1992 Pruss ............ F16H 61/0248
192/3.58
6,755,703 B1 * 6/2004 Erickson ............ B63H 21/213
440/75
(Continued)

FOREIGN PATENT DOCUMENTS

CN 101255921 A 9/2008
CN 101535688 A 9/2009
(Continued)

OTHER PUBLICATIONS

Chinese Office Action, dated 02/212/2017, in copending counterpart Chinese Patent Application No. 201480069215.7.

*Primary Examiner* — Terence Boes
(74) *Attorney, Agent, or Firm* — Kevin L. Parks

(57) ABSTRACT

A fluid arrangement for fluid actuation of at least one clutch and at least one transmission component and including a fluid energy source. The fluid energy source is a fluid pump including a first transport direction, in which the fluid pump serves on a transmission side to actuate the transmission component, and including a second transport direction opposite to the first transport direction, in which the fluid pump serves on a clutch side to actuate the clutch.

2 Claims, 6 Drawing Sheets

(51) Int. Cl.
*F16H 61/00* (2006.01)
*F16H 61/28* (2006.01)

(56) References Cited

U.S. PATENT DOCUMENTS

| | | |
|---|---|---|
| 10,151,391 B2 | 12/2018 | Herkommer et al. |
| 2011/0198180 A1 | 8/2011 | Momal et al. |
| 2013/0306431 A1 | 11/2013 | Ruehle et al. |
| 2018/0003248 A1* | 1/2018 | Herkommer ........ F16D 48/0206 |

FOREIGN PATENT DOCUMENTS

| | | |
|---|---|---|
| CN | 102278463 A | 12/2011 |
| CN | 102483151 A | 5/2012 |
| DE | 10 2008 009 653 A1 | 9/2008 |
| DE | 10 2010 047 801 A1 | 5/2011 |
| DE | 102013209937 A1 | 12/2013 |
| DE | 102013213281 A1 | 1/2014 |
| EP | 1081417 A2 | 3/2001 |
| EP | 2 664 826 A1 | 11/2013 |
| WO | WO 2006/002450 A1 | 1/2006 |
| WO | 2014079441 A2 | 5/2014 |
| WO | 2015067259 A1 | 5/2015 |

* cited by examiner

FLUID ARRANGEMENT

CROSS-REFERENCE TO RELATED APPLICATION

This application is the U.S. national phase application under 35 U.S.C. § 371 of International Application Serial No. PCT/DE2014/200719, having an international filing date of 16 Dec. 2014, and designating the United States, which claims priority based upon German Patent Application No. DE 10 2013 226 309.0, filed on 17 Dec. 2013, the entire contents of each of which applications are hereby incorporated by reference herein to the same extent as if fully rewritten.

BACKGROUND OF THE INVENTION

Field of the Invention

The present invention relates to a fluid arrangement and to a method for fluid a fluid energy source.

Description of the Related Art

From German published application DE 10 2008 009 653 A1, a hydraulic system for controlling a dual-clutch transmission of a motor vehicle is known. That system includes: a hydraulic energy source to supply the hydraulic system with hydraulic energy in the form of a hydraulic medium; a pressure accumulator to store the hydraulic energy; a clutch cooling system to cool clutches of the dual-clutch transmission utilizing the hydraulic medium; and clutch actuators to operate a first clutch and a second clutch; wherein the hydraulic energy source includes a double-suction electric pump.

From German published application DE 10 2010 047 801 A1, a hydrostatic actuator is known. The actuator includes a master cylinder having a housing and a piston that is axially movable within the housing, for pressurizing a pressure chamber that is filled with a pressurizing agent. The actuator includes a rolling planetary transmission unit with a sleeve that converts a rotary movement to an axial movement, the rolling planetary transmission unit being driven by an electric motor.

An object of the present invention is to simplify the actuation of at least one clutch and at least one transmission component having a fluid energy source.

SUMMARY OF THE INVENTION

In the case of a fluid arrangement for fluid actuation of a least one clutch and at least one transmission component and including a fluid energy source, the object is fulfilled in that the fluid energy source includes a fluid pump having a first transport direction, in which the fluid pump serves on a transmission side to actuate the transmission component, and having a second transport direction opposite to the first transport direction, in which the fluid pump serves on a clutch side to actuate the clutch. The fluid arrangement is preferably a hydraulic system that is operated using a hydraulic medium, such as hydraulic oil.

The fluid pump is preferably a hydraulic pump, in particular of positive displacement construction, for example a vane pump, a gear pump, or a reciprocating piston pump. The fluid pump is driven, for example, by an electric motor. The fluid pump used to actuate the transmission component and to actuate the clutch is also referred to as a pump actuator.

The transmission component is, for example, a gear selector, which serves to perform a selecting and/or a shifting motion. The clutch is a single clutch or a sub-clutch of a dual clutch. The clutch can be actuated directly or indirectly. Furthermore, the clutch can be designed to operate wet or dry. In the first transport direction, the clutch side is pressurized by the fluid pump. In the second transport direction, the transmission side is pressurized by the fluid pump. The transport directions can therefore also be referred to as pressure directions.

A preferred exemplary embodiment of the fluid arrangement is characterized in that at least one dead volume is provided both on the transmission side and on the clutch side. The dead volume acts like a hydraulic cylinder with a hydraulic piston, which has an end stop in both movement directions and is not connected to any other component. On the one side of the piston is hydraulic medium, which can be pressurized by means of the fluid pump. On the other side of the piston is an environmental medium. The environmental medium is not sealed pressure-tight, but can be sealed, for example, by a bellows. The dead volume serves advantageously to ensure that the clutch or the transmission component is only actuated when it is desired. The effect of the dead volumes is that the transmission component cannot be actuated as long as the clutch remains actuated, even if the clutch is moving at the time, for example from a closed position to an open position. Only when the actuation of the clutch is completed, that is, for example, when the clutch is disengaged, does an actuation of the transmission component begin. Likewise, the clutch is only actuated, for example closed, when the actuation of the transmission component is completed, for example when a gear is engaged.

Another preferred exemplary embodiment of the fluid arrangement is characterized in that pre-stressing forces on the transmission component and the clutch are greater than pressure forces that have to be overcome to fill the dead volumes. The dead volumes serve, for example, to enable all of the hydraulic medium to be pumped out of a slave cylinder on the clutch side when the clutch is actuated in reversing operation, before actuation of the transmission begins on the transmission side. Likewise, the dead volumes enable hydraulic medium to be pumped out of the transmission side without the clutch being actuated at the same time. The dead volume solves this problem in that, for example, when a closed clutch is being opened, the dead volume on the transmission side is filled as long as the clutch is decreasing pressure, before a transmission actuator is supplied with fluid.

Another preferred exemplary embodiment of the fluid arrangement is characterized in that a fluid reservoir is connected to the transmission side and to the clutch side by means of a dual-pressure valve. The dual-pressure valve ensures in a simple manner that only one side can be pressurized. After that pressure is reduced, the system switches over to the other side. The dual-pressure valve advantageously has two selector positions. In a first selector position, the fluid reservoir is connected to the transmission side. In the second selector position, the fluid reservoir is connected to the clutch side.

Another preferred exemplary embodiment of the fluid arrangement is characterized in that at least one fluid reservoir is connected to the transmission side by means of a first valve and to the clutch side by means of a second valve. The valves are preferably designed as 2/2 directional valves.

Another preferred exemplary embodiment of the fluid arrangement is characterized in that the valves are designed as check valves that close in the direction of the fluid reservoir. That ensures, in a simple manner, that no fluid from the side pressurized by the fluid pump gets into the fluid reservoir and makes it possible to prevent an unwanted reduction of pressure on the pressurized side.

Another preferred exemplary embodiment of the fluid arrangement is characterized in that the valves are designed as 2/2 directional valves with an open position and a closed position. The 2/2 directional valves are triggered electromagnetically, for example. That design of the valves provides the advantage that the dead volumes described earlier can be omitted. The open position corresponds advantageously to a neutral position of the respective valve device. To that end, the valves can be biased, for example, in their open positions.

Another preferred exemplary embodiment of the fluid arrangement is characterized in that the valves are designed as 2/2 directional valves with an open position and a check valve position. In the check valve position, the 2/2 directional valves prevent an unwanted reduction of pressure into the respective connected fluid reservoir. The 2/2 directional valves are advantageously biased into their check valve position, which corresponds to the neutral position. The 2/2 valves having the open position and the check valve position are preferably triggered hydraulically, and particularly advantageously with the pressure that prevails on the other side as the control pressure. That provides the advantage that the dead volumes described earlier can be omitted.

Another preferred exemplary embodiment of the fluid arrangement is characterized in that at least one fluid reservoir is connected to the transmission side through a first hydraulic resistance and/or to the clutch side through a second hydraulic resistance. The hydraulic resistances, preferably designed as orifice plates, serve to prevent excess fluid from collecting in the fluid arrangement and blocking the system. It can be especially advantageous to have an orifice plate only on the transmission side, since no pressure has to be held there.

Another preferred exemplary embodiment of the fluid arrangement is characterized in that a hydraulic clutch actuator is located on the clutch side and a hydraulic or partially hydraulic transmission actuator is located on the transmission side. The hydraulic clutch actuator is, for example, a hydraulic slave cylinder by means of which the clutch is closed or opened. The slave cylinder can be located outside or inside the clutch. The transmission can be actuated in a great variety of ways. According to one exemplary embodiment, the transmission is actuated by means of two slave cylinders which are triggered by means of valves. The valves are advantageously connected mechanically to transmission actuators, in particular to gear selectors.

In a method for fluid actuation of at least one clutch and at least one transmission component and having a fluid energy source, in particular having a fluid energy source described earlier, the object stated above is fulfilled alternatively or additionally in that a or the fluid pump is used in a first transport direction on a transmission side to actuate the transmission component, and in a second transport direction contrary to the first transport direction on a clutch side to actuate the clutch.

BRIEF DESCRIPTION OF THE DRAWINGS

Additional advantages, features, and details of the invention can be seen from the following description, in which various exemplary embodiments are described in detail with reference to the drawings. The drawing figures show the following.

DESCRIPTION OF THE PREFERRED EMBODIMENTS

Figure 1:
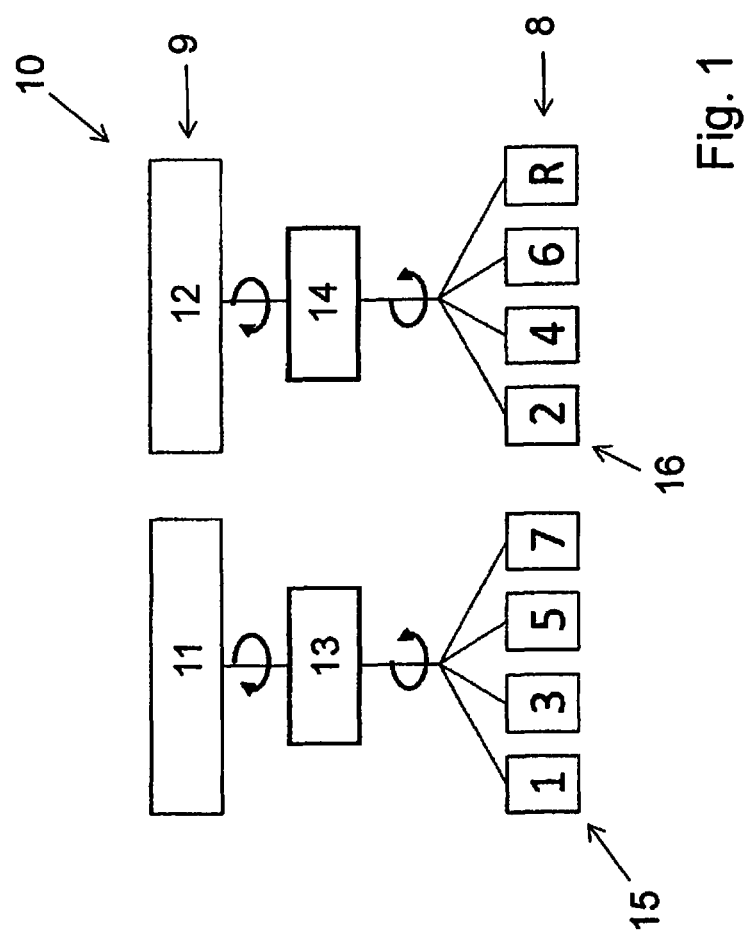
FIG. 1 is a greatly simplified representation of a fluid arrangement according to the present invention, having a dual clutch, two sub-transmissions, and two fluid pumps.

FIG. 1 shows a fluid arrangement 10 according to the present invention in a greatly simplified view. Rectangles 1 through 7 and R indicate gears of a transmission 8. Gears 1, 3, 5, and 7 are assigned to a first sub-transmission 15. Gears 2, 4, 6, and R are assigned to a second sub-transmission 16.

In addition, the fluid arrangement 10 includes a dual clutch 9 having a first sub-clutch 11 and a second sub-clutch 12. The first sub-clutch 11 and the first sub-transmission 15 are actuatable by a single fluid pump 13. The second sub-clutch 12 and the second sub-transmission 16 are actuatable by means of a single fluid pump 14.

The fluid pumps 13 and 14 transport in a first transport direction, as indicated by arrows, to actuate the sub-clutches 11, 12. To actuate the sub-transmissions 15, 16 the fluid pumps 13, 14 transport in a second transport direction, which is opposite to the first transport direction, as indicated by arrows.

FIGS. 2 through 6 illustrate five exemplary embodiments 20; 50; 60; 70; and 80 of a fluid arrangement according to the invention, and in the form of fluid circuit diagrams. The fluid arrangement 20; 50; 60; 70; 80 is located in a drive train (not shown) of a motor vehicle. In a drive train, the fluid arrangement serves to actuate a transmission component 21 (indicated only by a dashed rectangle) and a clutch 22 (likewise indicated only by a dashed rectangle).

The transmission component 21 includes on a transmission side a transmission or sub-transmission 24. Two transmission actuators 25, 26 are assigned to the transmission 24. The transmission actuators 25, 26 are designed as hydraulic slave cylinders, which are triggered by means of valves 27, 28. The valves 27, 28 are, for example, connected mechanically to gear selectors.

In practice, more gear selectors or transmission actuators are needed than shown in the example. Depending on the design of the transmission component 21, all that is needed to actuate the transmission is one pressure signal, which is provided on the transmission side. The transmission actuation can also be achieved by an actuating system, which also has, besides electrical inputs, a hydraulic input which is subjected to a flow volume by the fluid arrangement according to the invention.

The clutch 22 includes, for example, a sub-clutch 34 of a dual clutch. The sub-clutch 34 is designed, for example, as a dry-running friction clutch with a contact plate 35. The contact plate 35 is subjected to an actuating force through an actuating bearing 36 by a hydraulic clutch actuator 37. In the illustrated exemplary embodiment, the hydraulic clutch actuator 37 is designed as a slave cylinder.

According to an essential aspect of the present invention, the actuation of the transmission component 21 and of the clutch 22 is accomplished by a fluid pump 40 having a first transport direction or pressure direction, in which the fluid pump 40 on the transmission side serves to actuate the transmission component 21.

The fluid pump 40 serves in a second transport direction on the clutch side, opposite to the first transport direction, to actuate the clutch 22. To that end, the fluid pump 40 is designed as a reversing pump, to which are connected a hydraulic line 29 on the transmission side and a hydraulic line 39 on the clutch side.

Figure 2:
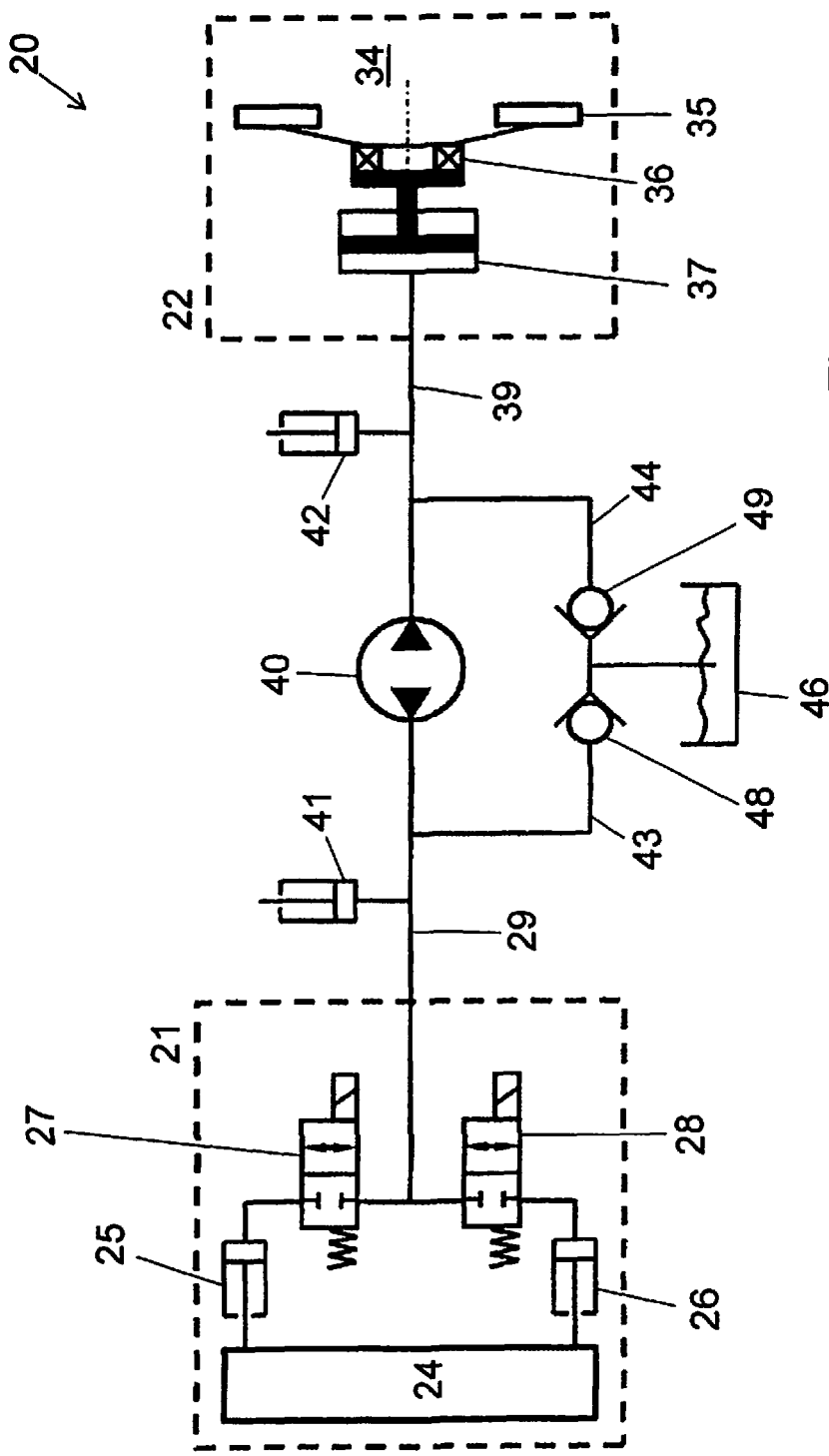
FIG. 2 is a fluid circuit diagram of a fluid arrangement having a clutch, a sub-transmission, and a fluid pump according to a first exemplary embodiment that includes dead volumes.

In the fluid arrangement 20 shown in FIG. 2, a first dead volume 41 is connected to the hydraulic line 29 on the transmission side. On the clutch side, a second dead volume 42 is connected to the hydraulic line 39. Each of the dead volumes 41, 42 acts like a hydraulic cylinder with a piston which has an end stop in each direction. The piston is not connected to any other component. On the one side, the piston is acted on by hydraulic medium through the hydraulic line 29, 39. On the other side, the piston is subjected to an environmental medium. The environmental medium is not sealed pressure-tight, but can be sealed for example by a bellows.

Each dead volume 41, 42 serves to ensure that the clutch 22 or the transmission component 21 is only actuated when that is desired. No actuation or operation of the transmission component 21 can take place as long as the clutch 22 is under pressure, even if it is moving in the opening direction at the moment. Only when the clutch 22 is open can the transmission actuation begin. Likewise, the clutch 22 can not be pressed closed until a gear is securely engaged.

So in reversing operation with the clutch 22 actuated, the entire volume is supposed to be able to be pumped out of the slave cylinder 37 on the clutch side before an actuation or operation on the transmission side begins. Likewise, volume is supposed to be able to be pumped out of the transmission side without closing the clutch 22.

Each dead volume 41, 42 solves that problem in that, for example, when the closed clutch 22 is being opened, the dead volume 41 on the transmission side is filled as long as the clutch 22 is decreasing pressure, before the transmission actuator 25, 26 is supplied with fluid. The decisive factor here is that the biasing of clutch 22 and transmission component 21 is greater than the pressure that is needed to fill the respective dead volume 42, 41.

A fluid reservoir 46 is connected via a connecting line 43 on the transmission side to the hydraulic line 29. A first valve 48 is located in the connecting line 43. The fluid reservoir 46 is connected via a second connecting line 44 on the clutch side to the hydraulic line 39. A second valve 49 is located in the second connecting line 44. The two valves 48 and 49 are designed as check valves, which block in the direction of the fluid reservoir 46.

Figure 3:
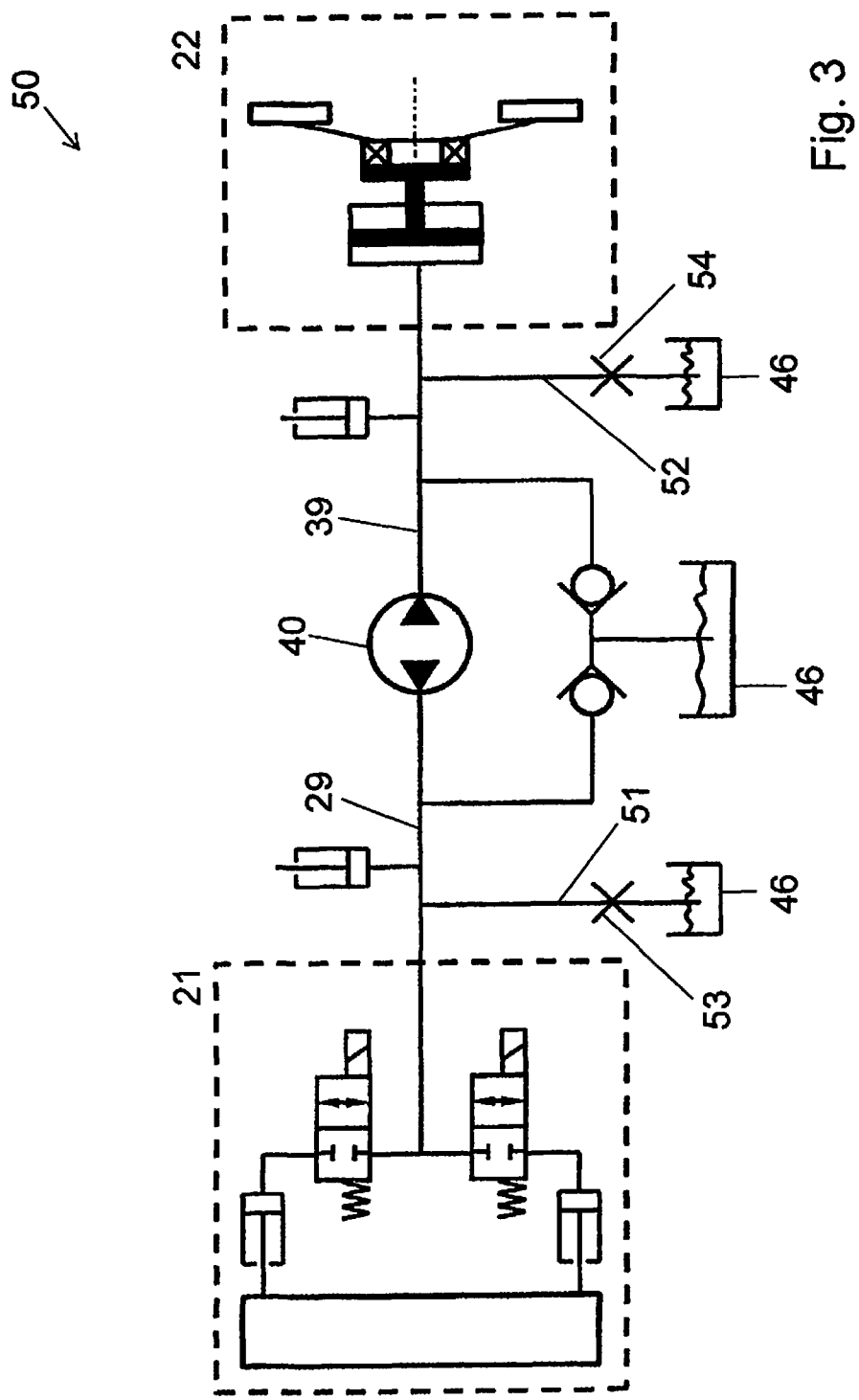
FIG. 3 shows a fluid arrangement similar to that shown in FIG. 2 and having two additional hydraulic resistances.

Compared to the fluid arrangement 20 shown in FIG. 2, the fluid arrangement 50 shown in FIG. 3 includes two additional hydraulic resistances 53, 54. The hydraulic resistance 53 is located in a connecting line 51 which joins the hydraulic line 29 on the transmission side to a or the fluid reservoir 46. The hydraulic resistance 54 is located in a connecting line 52 which joins the hydraulic line 39 on the clutch side to a or the fluid reservoir 46. The two hydraulic resistances 53, 54 are designed, for example, as orifice plates. The orifice plates 53, 54 serve to prevent excess fluid from collecting in the fluid arrangement 50 and blocking the system.

Figure 4:
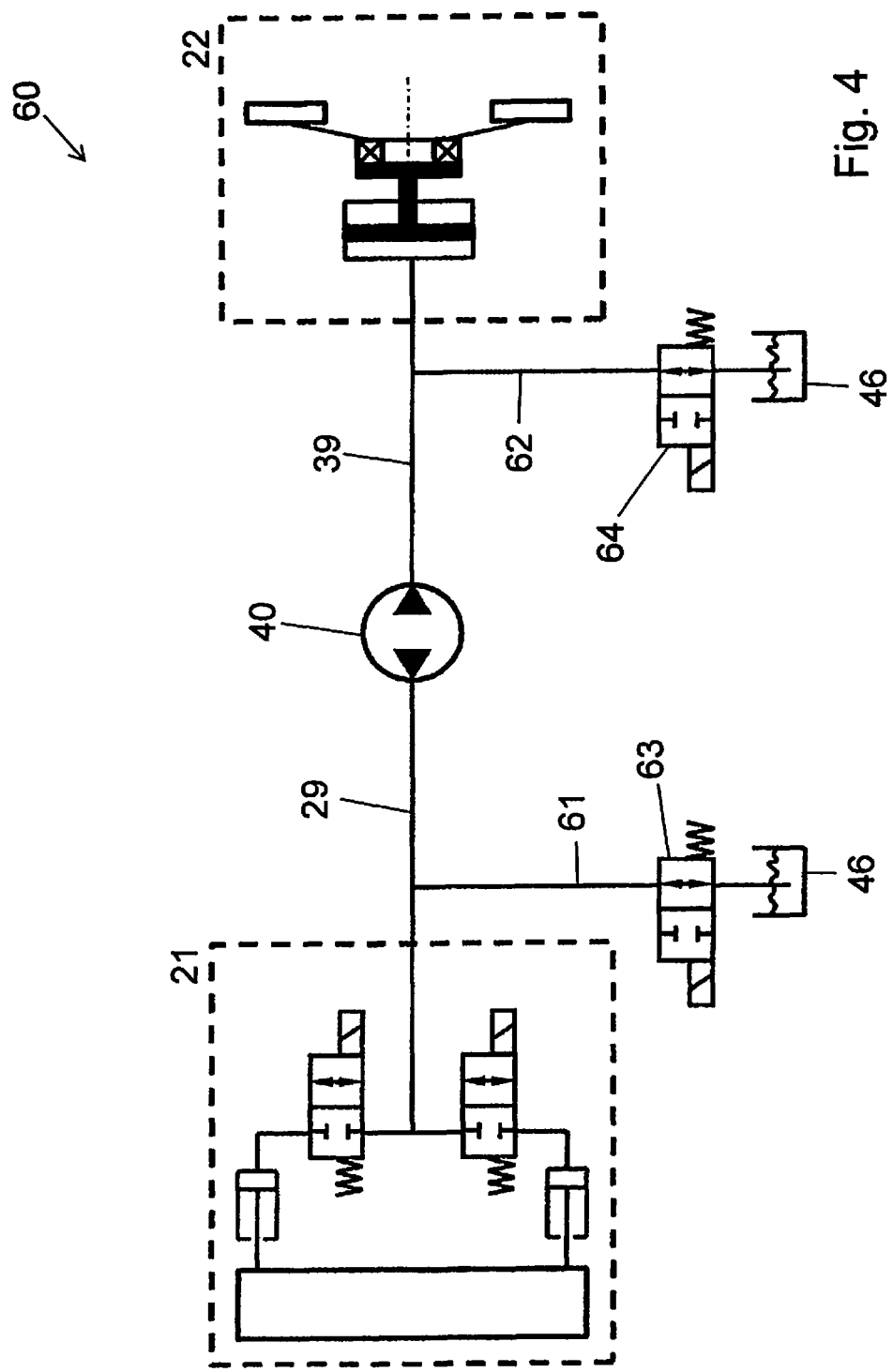
FIG. 4 shows a fluid arrangement similar to that shown in FIGS. 2 and 3 and having two drain valves.

In the fluid arrangement 60 shown in FIG. 4, compared to the fluid arrangement 50 shown in FIG. 3, the hydraulic resistances (53 and 54 in FIG. 3) are replaced by valves 63 and 64, respectively. The valve 63 is assigned to a connecting line 61 which joins the hydraulic line 29 on the transmission side to a or the fluid reservoir 46. The valve 64 is assigned to a connecting line 62 which joins the hydraulic line 39 on the clutch side to a or the fluid reservoir 46.

The two valves 63 and 64 are designed as electromagnetically actuated 2/2 directional valves with an open position and a closed position. The two valves 63 and 64 are biased in their shown open position. The active triggering of the valves 63 and 64 makes it possible for the dead volumes (41 and 42 in FIG. 2) and the check valves (48, 49 in FIG. 2) to be omitted.

Figure 5:
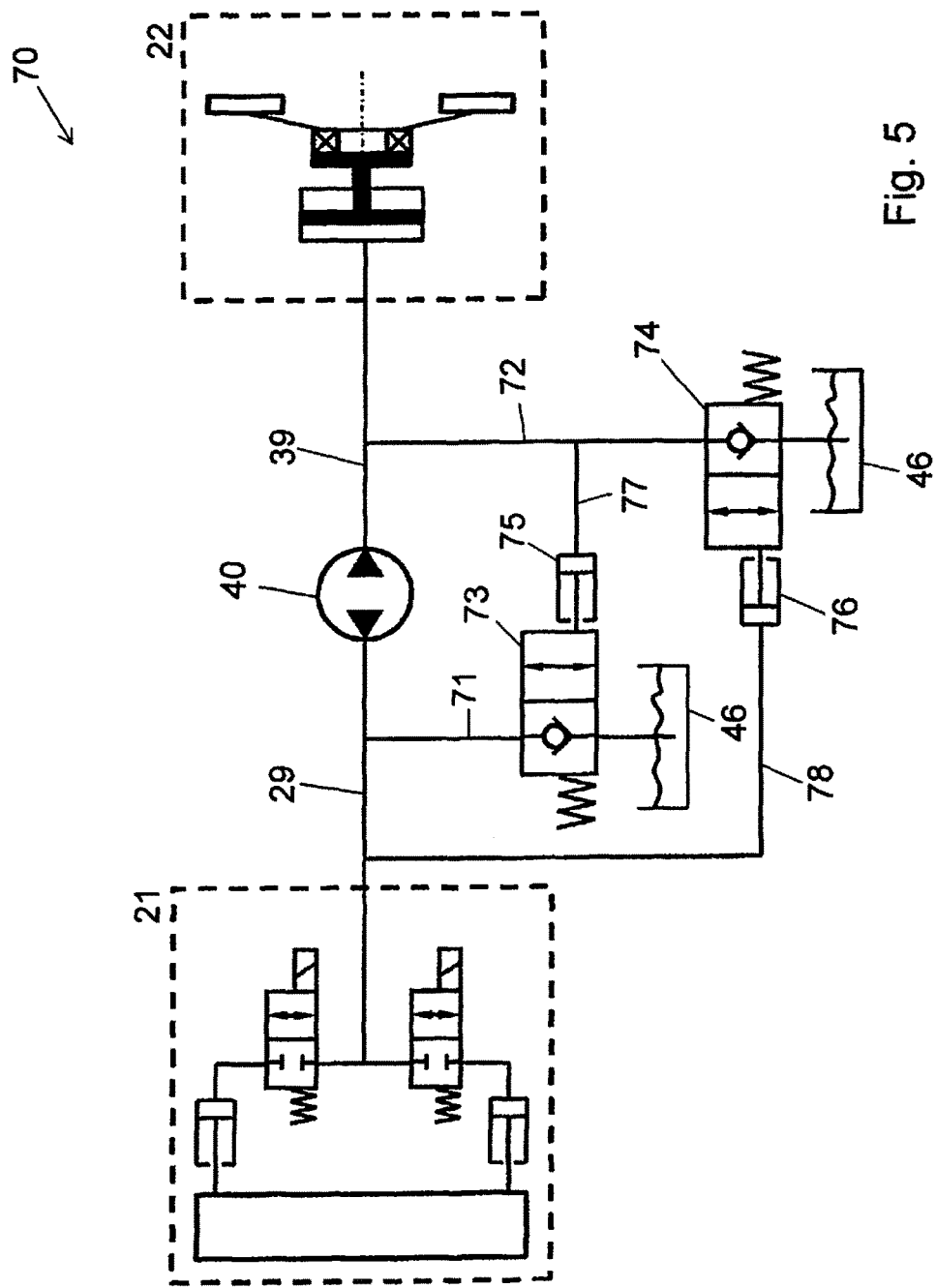
FIG. 5 shows a fluid arrangement similar to that shown in FIGS. 2 through 4 and having two valves that have a check valve function.

The fluid arrangement 70 shown in FIG. 5 includes a first connecting line 71 that joins the hydraulic line 29 on the transmission side to a or the fluid reservoir 46. A connecting line 72 joins a or the fluid reservoir 46 on the clutch side to the hydraulic line 39. The connecting line 71 on the transmission side is assigned to a valve 73. The connecting line 72 on the clutch side is assigned to a valve 74. The valves 73 and 74 function in their shown neutral state as check valves. In the neutral state, the valves 73 and 74 function exactly like the check valves 48 and 49 in FIG. 2.

The valve 73 on the transmission side is assigned to a control cylinder 75, which is connected in terms of control via a control line 77 to the connecting line 72 on the clutch side. Analogously, the valve 74 is assigned to a control cylinder 76, which is connected in terms of control via a control line 78 to the hydraulic line 29 on the transmission side.

If pressure is now built up on the transmission side, the valve 74 is opened by the control cylinder 76, and is kept open as long as there is pressure on the transmission side. That prevents the clutch 22 from being closed when the direction of the fluid pump 40 is reversed before the transmission 21 is free of pressure. On the other hand, if pressure is built up on the clutch side, the valve 73 is opened by the control cylinder 75, and is kept open as long as there is pressure present on the clutch side.

Figure 6:
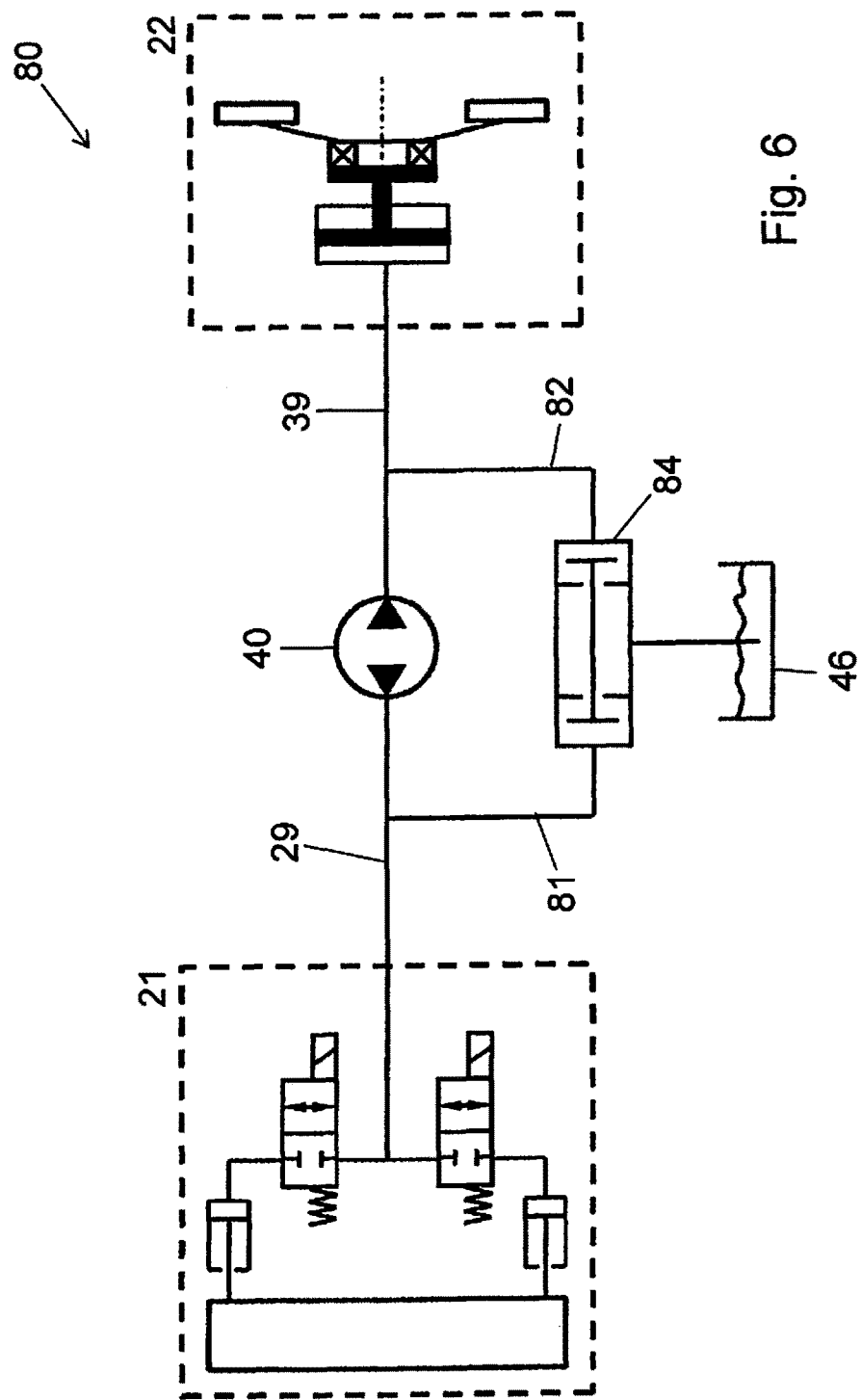
FIG. 6 shows a fluid arrangement similar to that shown in FIGS. 2 through 5 and having a dual-pressure valve.

In the fluid arrangement 80 shown in FIG. 6, a fluid reservoir 46 is connected, with a dual-pressure valve 84 interposed, via a first connecting line 81 to the hydraulic line 29 and via a second connecting line 82 to the hydraulic line 39. The dual-pressure valve 84 ensures in a simple manner that pressure can be present on only one side, and that after that pressure is reduced the system switches over to the other side. The fluid arrangement 80 makes essentially the same function possible as the fluid arrangement 70 in FIG. 5, but is of simpler design.

What is claimed is:
1. A fluid arrangement comprising:
a reversible pump;
a transmission actuator;
a transmission hydraulic line connecting the reversible pump to the transmission actuator;
a clutch actuator;
a clutch hydraulic line connecting the reversible pump to the clutch actuator
a first connecting line connecting the transmission hydraulic line to a fluid reservoir;
a second connecting line connecting the transmission hydraulic line to the fluid reservoir; and, a dual pressure valve hydraulically connected to the first connecting line, the second connecting line, and the reservoir, wherein:
  the dual pressure valve comprises:
    a first control cylinder hydraulically connected to the first connecting line; and,
    a second control cylinder hydraulically connected to the second connecting line;
  the first control cylinder is arranged to connect the second connecting line to the fluid reservoir when operated on by a pressure in the first connecting line; and,
  the second control cylinder is arranged to connect the first connecting line to the fluid reservoir when operated on by a pressure in the second connecting line.

2. The fluid arrangement of claim 1 further comprising a hydraulic medium, wherein the reversible pump is configured such that:
  rotation of the reversible pump in a first rotational direction pressurizes the hydraulic medium to actuate the transmission actuator; and,
  rotation of the reversible pump in a second rotational direction, opposite to the first rotational direction, pressurizes the hydraulic medium to actuate the clutch actuator.

* * * * *